US011763702B2

(12) United States Patent
Cui et al.

(10) Patent No.: US 11,763,702 B2
(45) Date of Patent: Sep. 19, 2023

(54) COVER PLATE AND FOLDABLE DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zhihong Cui, Beijing (CN); Binfeng Feng, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/801,898

(22) PCT Filed: Sep. 10, 2021

(86) PCT No.: PCT/CN2021/117599
§ 371 (c)(1),
(2) Date: Aug. 24, 2022

(87) PCT Pub. No.: WO2022/089036
PCT Pub. Date: May 5, 2022

(65) Prior Publication Data
US 2023/0080928 A1    Mar. 16, 2023

(30) Foreign Application Priority Data

Oct. 30, 2020 (CN) .......................... 202011190597.2

(51) Int. Cl.
*G06F 3/041* (2006.01)
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC ... G09F 9/301; G06F 1/1652; G09G 2380/02; H10K 2102/311
See application file for complete search history.

(56) References Cited

U.S. PATENT DOCUMENTS

2017/0082784 A1* 3/2017 Niu ..................... H04M 1/0266
2017/0277225 A1   9/2017 Yeom
(Continued)

FOREIGN PATENT DOCUMENTS

CN        105867533 A     8/2016
CN        106101560 A    11/2016
(Continued)

OTHER PUBLICATIONS

Written Opinion from PCT/CN2021/117599 dated Nov. 22, 2021. 3 pages.
(Continued)

*Primary Examiner* — Joe H Cheng
(74) *Attorney, Agent, or Firm* — Calfee, Halter & Griswold LLP

(57) ABSTRACT

A cover plate and a foldable display apparatus. The cover plate is applied to a foldable display apparatus. A surface of the cover plate that is away from a first display panel is a first surface; the first surface includes a central plane, and a marginal plane, a first marginal cambered surface, a second marginal cambered surface and a third marginal cambered surface which surround the central plane and are successively connected end to end; wherein the marginal plane is located on a side of the second marginal cambered surface that is close to a foldable area, and the curvatures of the first marginal cambered surface and the third marginal cambered (Continued)

surface gradually decrease along a direction from the second marginal cambered surface to the marginal plane.

17 Claims, 15 Drawing Sheets

(56) References Cited

U.S. PATENT DOCUMENTS

| | | | | |
|---|---|---|---|---|
| 2020/0209916 | A1 | 7/2020 | Zhang et al. | |
| 2020/0401275 | A1* | 12/2020 | Shin | G06F 3/0445 |
| 2022/0161536 | A1* | 5/2022 | Liu | H01L 21/67 |

FOREIGN PATENT DOCUMENTS

| | | | | |
|---|---|---|---|---|
| CN | 106873717 | A | | 6/2017 |
| CN | 207766300 | U * | | 8/2018 |
| CN | 108711577 | A | | 10/2018 |
| CN | 109634365 | A | | 4/2019 |
| CN | 208739155 | U * | | 4/2019 |
| CN | 110010013 | A | | 7/2019 |
| CN | 110012132 | A | | 7/2019 |
| CN | 110176188 | A | | 8/2019 |
| CN | 305595981 | S | | 2/2020 |
| CN | 110928365 | A | | 3/2020 |
| CN | 110992827 | A | | 4/2020 |
| CN | 305956727 | S | | 7/2020 |
| CN | 111590995 | A * | | 8/2020 |
| CN | 111667771 | A | | 9/2020 |
| CN | 211791606 | U | | 10/2020 |
| CN | 212229975 | U | | 12/2020 |
| CN | 213150200 | U | | 5/2021 |
| DE | 102019135809 | A1 | | 7/2020 |
| KR | 20190004585 | A | | 1/2019 |
| KR | 20200008727 | A * | | 1/2020 |

OTHER PUBLICATIONS

Interntional Search Report from PCT/CN2021/117599 dated Nov. 22, 2021. 6 pages.

* cited by examiner

COVER PLATE AND FOLDABLE DISPLAY APPARATUS

CROSS REFERENCE

The present disclosure is a U.S. national phase application of International Application No. PCT/CN2021/117599 filed on Sep. 10, 2021, which claims priority to a Chinese Patent Application No. 202011190597.2, filed on Oct. 30, 2020 and entitled "COVER PLATE AND FOLDABLE DISPLAY APPARATUS", which is incorporated herein by reference in its entirety.

TECHNICAL FIELD

The present disclosure relates to the field of display technology, and in particular, to a cover plate and a foldable display apparatus.

BACKGROUND

At present, foldable display products (such as foldable mobile phones) are rising rapidly. For in-folding display products, a secondary display screen is usually equipped on a rear of the foldable display product as one of application scenarios. A size of the secondary display screen is usually half of a size of a main display screen. The secondary display screen is installed on a whole machine, three edges of the secondary display screen are adjacent to a frame of the foldable display product, and the other edge of the secondary display screen is located in the middle of the foldable display product. Although it allows the foldable display product to own various application scenarios by equipping a secondary display screen on the rear of the foldable display product, the reliability of the foldable display product will be reduced. For example, the secondary display screen is prone to be damaged during a drop test.

It should be noted that the information disclosed in above section is only for enhancement of understanding of the background of the present disclosure, and thus may include information that does not constitute the prior art known to those of ordinary skill in the art.

SUMMARY

The purpose of the present disclosure is to provide a cover plate and a foldable display apparatus to improve product reliability.

One aspect of the present disclosure provides a cover plate, which is applied to a foldable display apparatus including a first area, a second area and a foldable area connecting the first area and the second area, wherein the foldable display apparatus comprises a first display panel located in the first area, and the cover plate is located in the first area and arranged on a display side of the first display panel; wherein a surface of the cover plate away from the first display panel is a first surface; the first surface comprises a central plane, a marginal plane, a first marginal cambered surface, a second marginal cambered surface and a third marginal cambered surface, wherein the marginal plane, the first marginal cambered surface, the second marginal cambered surface and the third marginal cambered surface surround the central plane and are connected end to end in sequence, the marginal plane and the second marginal cambered surface are oppositely arranged in a first direction, and the first marginal cambered surface and the third marginal cambered surface are oppositely arranged in a second direction, the second direction and the first direction being perpendicular to each other; and wherein the marginal plane is located on a side of the second marginal cambered surface close to the foldable area, and a curvature of the first marginal cambered surface and a curvature of the third marginal cambered surface gradually decrease along a direction from the second marginal cambered surface to the marginal plane.

In some embodiments of the present disclosure, the curvature of the first marginal cambered surface at which the first marginal cambered surface meets the marginal plane is 0; and the curvature of the third marginal cambered surface at which the third marginal cambered surface meets the marginal plane is 0.

In some embodiments of the present disclosure, a width of the first marginal cambered surface at which the first marginal cambered surface meets the marginal plane is W1, a width of the first marginal cambered surface at which the first marginal cambered surface meets the second marginal cambered surface is W2, and a ratio of W2 to W1 is 0.5 to 0.8; and a width of the third marginal cambered surface at which the third marginal cambered surface meets the marginal plane is W3, a width of the third marginal cambered surface at which the third marginal cambered surface meets the second marginal cambered surface is W4, and a ratio of W4 to W3 is 0.5 to 0.8;

wherein the width is a dimension in the second direction.

In some embodiments of the present disclosure, a curvature of the second marginal cambered surface is the same everywhere in the second direction.

In some embodiments of the present disclosure, a surface of the cover plate close to the first display panel is a second surface, wherein the second surface is a plane.

In some embodiments of the present disclosure, a surface of the cover plate close to the first display panel is a second surface, wherein an area of the second surface opposite to the central plane and an area of the second surface opposite to the marginal plane are both planes; and areas of the second surface opposite to the first marginal cambered surface, the second marginal cambered surface, and the third marginal cambered surface are all cambered surfaces.

In some embodiments of the present disclosure, wherein a curvature of the area of the second surface opposite to the first marginal cambered surface is the same as the curvature of the first marginal cambered surface;

a curvature of the area of the second surface opposite to the second marginal cambered surface is the same as a curvature of the second marginal cambered surface; and a curvature of the area of the second surface opposite to the third marginal cambered surface is the same as the curvature of the third marginal cambered surface.

Another aspect of the present disclosure provides a foldable display apparatus, the foldable display apparatus includes a first area, a second area, and a foldable area connecting the first area and the second area, wherein the foldable display apparatus comprises a first display panel and a first cover plate; the first display panel and the first cover plate are located in the first area; the first cover plate is arranged on a display side of the first display panel; and the first cover plate is the cover plate according to any of the above.

In some embodiments of the present disclosure, the first display panel includes a display area and a non-display area arranged around the display area; the display area has a first boundary and a second boundary opposite in the second direction; and both the first boundary and the second boundary extend in the first direction;

a boundary at which the first marginal cambered surface meets the central plane is a third boundary; and the third boundary intersects with the first boundary at a first intersection point; and a boundary at which the third marginal cambered surface meets the central plane is a fourth boundary; and the fourth boundary intersects with the second boundary at a second intersection point; wherein a ratio of a length of a line segment of the first boundary extending from the first intersection point towards the second marginal cambered surface to a length of a line segment of the first boundary extending from the first intersection point towards the marginal plane is 0.2 to 0.5; and a ratio of a length of a line segment of the second boundary extending from the second intersection point towards the second marginal cambered surface to a length of a line segment of the second boundary extending from the second intersection point towards the marginal plane is 0.2 to 0.5.

In some embodiments of the present disclosure, the first display panel is flexible, and comprises a display part, a binding part located on a rear side of the display part, and a bending part connecting the display part and the binding part; the first cover plate is arranged on a display side of the display part; and the display part comprises the display area and the non-display area; wherein a part of an orthographic projection of the binding part on a reference plane is located within an orthographic projection of the third marginal cambered surface on the reference plane, and another part of the orthographic projection of the binding part on the reference plane is located within an orthographic projection of the central plane on the reference plane, wherein the reference plane is a plane parallel to the central plane.

In some embodiments of the present disclosure, the foldable display apparatus further includes a second display panel and a second cover plate, wherein the second display panel and the second cover plate are located in the first area, the second area and the foldable area; wherein the second display panel and the second cover plate are flexible, a side of the second display panel away from the first display panel is a display side of the second display panel, the second cover plate is located on the display side of the second display panel, and an outer contour of the second cover plate extends beyond an outer contour of the second display panel.

It should be understood that both the foregoing general description and the following detailed description are exemplary and explanatory only, and are not restrictive of the present disclosure.

BRIEF DESCRIPTION OF THE DRAWINGS

The drawings, which are incorporated into and constitute a part of the specification, illustrate embodiments consistent with the present disclosure and serve together with the specification to explain the principles of the present disclosure. Obviously, the drawings in the following descriptions are only some embodiments of the present disclosure, and for those of ordinary skill in the art, other drawings can also be obtained from these drawings without creative efforts.

DETAILED DESCRIPTION

Figure 1:
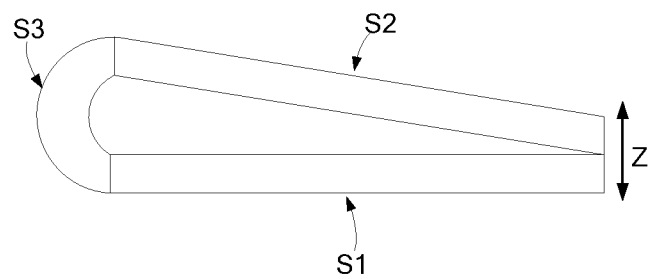
FIG. 1 shows a schematic structural diagram of a foldable display apparatus in a folded state according to an embodiment of the present disclosure.

In order to make objectives, technical solutions and advantages of the present disclosure clearer, embodiments of the present disclosure will be described in detail below with reference to the drawings. It should be noted that embodiments may be implemented in many different ways. Those of ordinary skill in the art can easily understand that the manner and the content can be changed into various forms without departing from the spirit and scope of the present disclosure. Therefore, the present disclosure should not be construed as being limited only to the contents described in the following embodiments. Embodiments of the present disclosure and the features of the embodiments may be arbitrarily combined with each other without conflict.

In the drawings, a size of each constituent element, and a thickness or a region of a layer, are sometimes exaggerated for clarity. Therefore, one implementation of the present disclosure is not necessarily limited to the size, and shapes and sizes of the various components in the drawings do not reflect true scale. In addition, the drawings schematically show ideal examples, and one implementation of the present disclosure is not limited to the shapes, numerical values, and the like shown in the drawings.

It should be noted that "on" described herein can mean that one layer is directly formed or arranged on another layer, or it can mean that one layer is indirectly formed or arranged on another layer, that is, there is another layer between the two layers.

The terms "a", "the", and "this" are used to indicate the presence of one or more elements/components/etc. The term "comprise" is used to indicate an open-ended inclusive meaning and refers to possible presence of additional elements/components/etc., in addition to listed elements/components/etc.

In the present specification, ordinal numbers such as "first" and "second" are provided to avoid confusion of constituent elements, and are not intended to be limited in quantity.

In the present specification, unless expressly stated and defined otherwise, the term "connect" should be construed in a broad sense. For example, it may be a fixed connection, or a detachable connection, or an integral connection; it may be a mechanical connection, or an electrical connection; it may be a direct connection, or an indirect connection via an intermediate component, or an internal communication between two components. For those of ordinary skill in the art, the specific meanings of above terms in the present disclosure can be understood according to specific situations.

Figure 2:
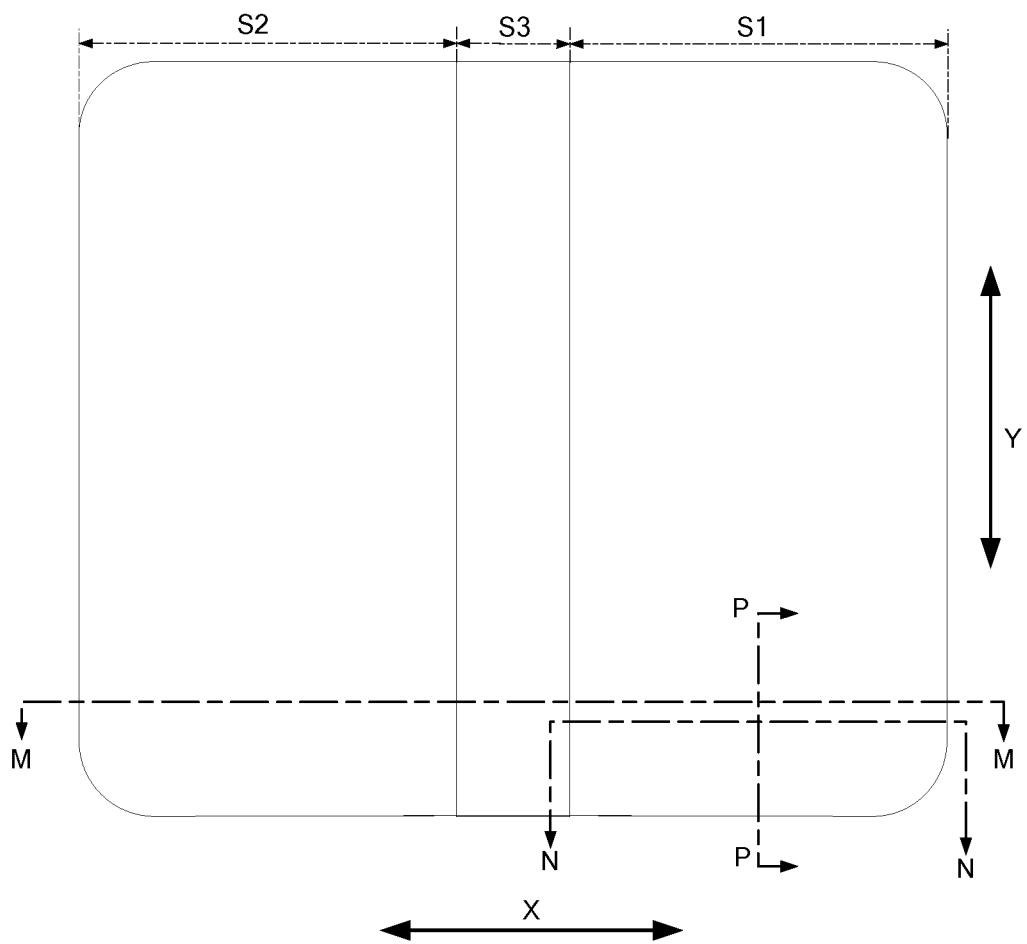
FIG. 2 shows a schematic structural diagram of a foldable display apparatus in an unfolded state according to an embodiment of the present disclosure.
Figure 3:
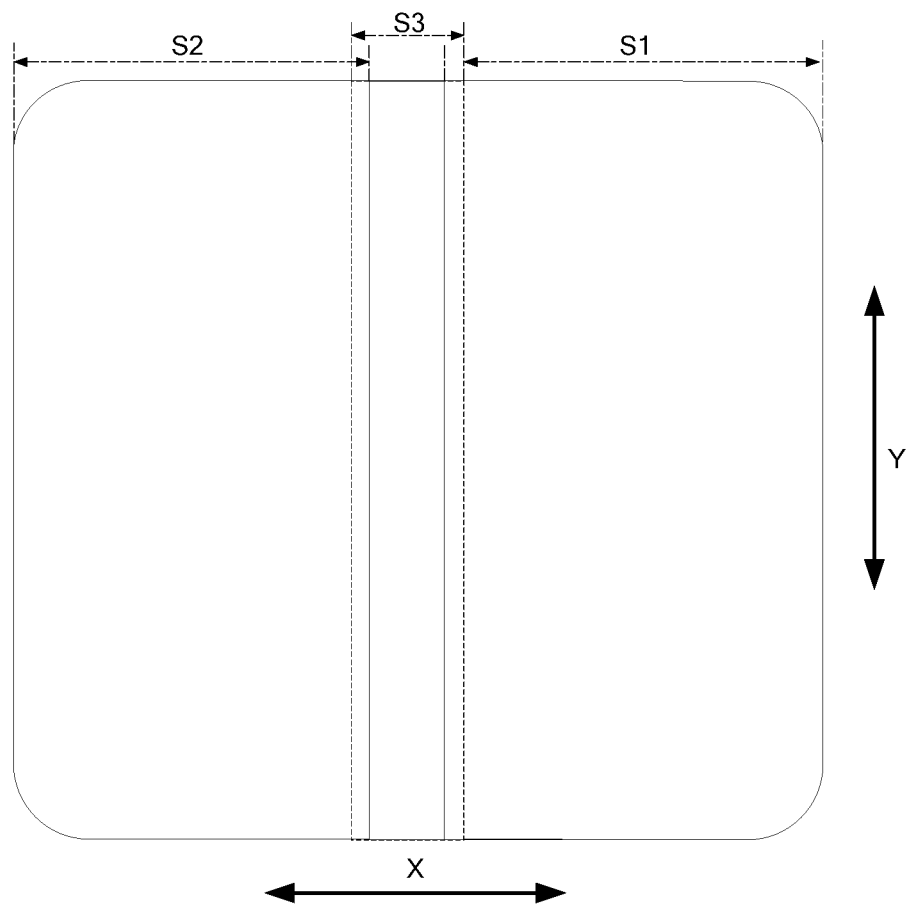
FIG. 3 shows a schematic structural diagram of a foldable display apparatus in an unfolded state according to another embodiment of the present disclosure.

Some embodiments of the present disclosure provide a foldable display apparatus, which includes a first area S1, a second area S2, and a foldable area S3 connecting the first area S1 with the second area S2. As shown in FIG. 1, the foldable display apparatus may have a folded state. When the foldable display apparatus is in the folded state, the foldable area S3 as a whole may appear to be in a bending state, and the first area S1 and the second area S2 are arranged in a thickness direction Z of the foldable display apparatus. As shown in FIGS. 2 and 3, the foldable display apparatus may also have an unfolded state. When the foldable display apparatus is in the unfolded state, the foldable area S3 as a whole may appear to be in a planar state, and the first area S1 and the second area S2 are arranged in a first direction X, which is perpendicular to the thickness direction Z of the foldable display apparatus.

It should be noted that, as shown in FIG. 1, the foldable area S3 according to embodiments of the present disclosure can be completely exposed relative to the first area Si and the second area S2 when the foldable display apparatus is in the folded state. The foldable area S3 according to embodiments of the present disclosure can be completely exposed relative to the first area S1 and the second area S2 when the foldable display apparatus is in the unfolded state, as shown in FIG. 2. However, embodiments of the present disclosure are not limited to this, and the foldable area S3 according to embodiments can also be at least partly hidden in the first area S1 and the second area S2 when the foldable display apparatus is in the unfolded state, as shown in FIG. 3.

In addition, it should be noted that when the foldable display apparatus is in the folded state, the entire first area S1 and the entire second area S2 are basically not bent.

The structure of the foldable display apparatus according to embodiments of the present disclosure will be described in detail below with reference to the drawings.

The foldable display apparatus may include a first display panel 10 and a first cover plate 29, and the first display panel 10 and the first cover plate 29 are located in the first area S1. The first cover plate 29 is arranged on a display side of the first display panel 10. The first cover plate 29 and the first display panel 10 as a whole can constitute a display screen of the foldable display apparatus.

It should be noted that, as mentioned above, when the foldable display apparatus is in the folded state, the entire first area S1 is basically not bent, thus the first cover plate 29 may be less flexible (i.e., not prone to deformation) cover glass. However, embodiments are not limited to this, the first cover plate 29 may also be a cover plate made of high molecular polymer with good flexibility (i.e., prone to deformation). Similarly, the first display panel 10 can be a rigid panel that is not prone to deformation, or a flexible panel that is prone to deformation.

Figure 4:
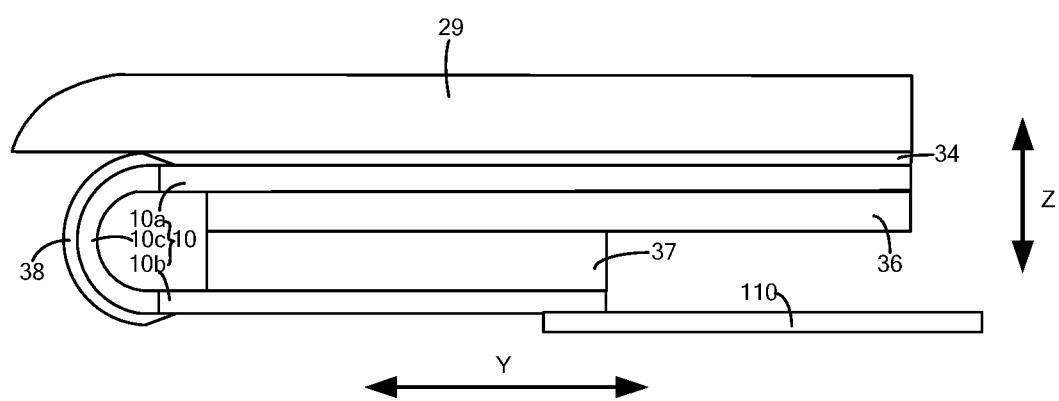
FIG. 4 shows a schematic sectional view of the foldable display apparatus according to an embodiment of FIG. 2 taken along a line P-P.

For example, the first display panel 10 according to embodiments of the present disclosure may be a flexible panel, that is, the first display panel may have flexibility. Specifically, as shown in FIG. 4, the first display panel 10 may include a display part 10a, a binding part 10b located on a rear side of the display part 10a, and a bending part 10c connecting the display part 10a with the binding part 10b. The display part 10a may be an OLED (Organic Light Emitting Diode) display, but not limited to this. It should be understood that, the first cover plate 29 mentioned before needs to be arranged on a display side of the display part 10a. That is, the first cover plate 29 is arranged on a side of the display part 10a away from the binding part 10b. Herein, the first cover plate 29 may be adhered to one side of the display part 10a through an adhesive layer 34. In addition, it should be noted that, the structure of the first display panel 10 according to embodiments of the present disclosure is not limited to the bending structure mentioned before, and may also be a planar structure as a whole.

Optionally, as shown in FIG. 4, a first heat-dissipation film layer 36 may be provided on the rear side of the display part 10a. An orthographic projection of the first heat-dissipation film layer 36 on the display part 10a is within or coincident with the display part 10a. For example, the first heat-dissipation film layer 36 may be a multi-layer structure, and may include an EMBO (embossed silicone buffer material) layer, a Foam (foam material) layer, a PI (polyamide film) layer, a Cu (copper) foil layer and a wave absorbing material layer, etc., arranged in sequence, but not limited to this. The first heat-dissipation film layer 36 may also be composed of other film layers, as long as it can ensure that the first heat-dissipation film layer 36 has good heat dissipation performance and bendability. In addition, the first heat-dissipation film layer 36 may also be a single-layer structure, depending on specific situations.

As shown in FIG. 4, an elevating film layer 37 may also be provided between the first heat-dissipation film layer 36 and the binding part 10b. By arranging the elevating film layer 37, the bending radian and the bending stability of the first display panel 10 can be ensured.

In addition, as shown in FIG. 4, an outer side of the bending part 10c may be covered with a strain neutral adhesive layer 38, and the strain neutral adhesive layer 38 may also cover boundaries of the display part 10a and the binding part 10b. By arranging the strain neutral adhesive layer 38, the bending part 10c can be protected, so as to avoid the break of the bending part 10c in a bending process. The strain neutral adhesive layer 38 may be an organic adhesive material, for example.

Figure 5:
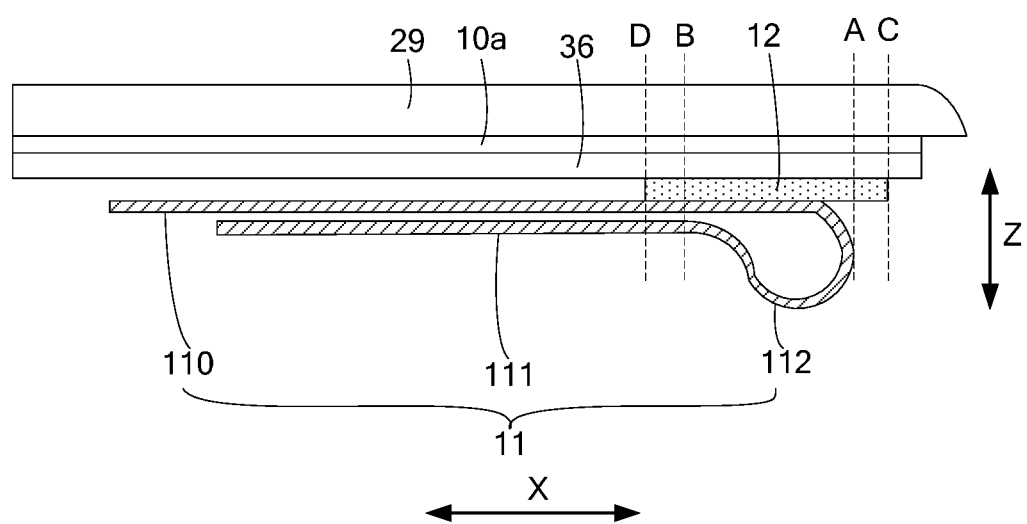
FIG. 5 shows a schematic sectional view of the foldable display apparatus according to an embodiment of FIG. 2 taken along a line N-N.

In some embodiments of the present disclosure, as shown in FIG. 5, the foldable display apparatus may further include a first flexible printed circuit 11 and a rigid film 12.

Figure 6:
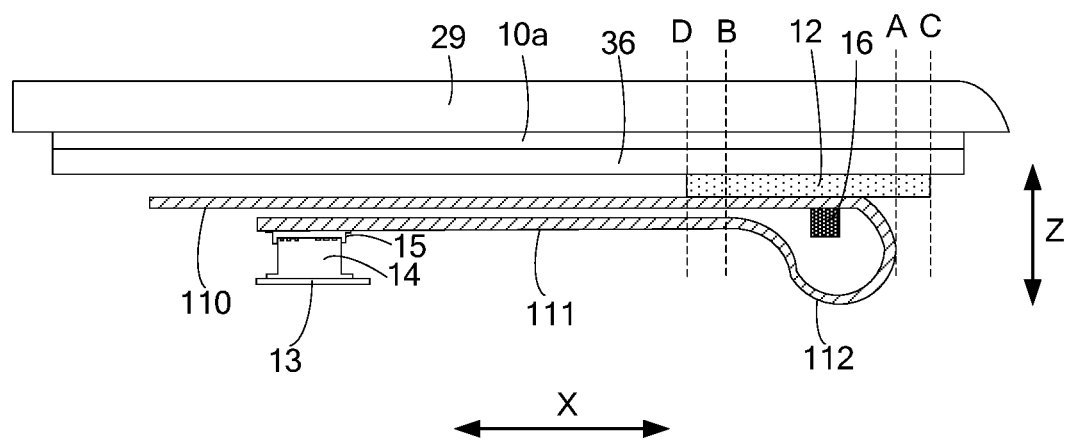
FIG. 6 shows a schematic sectional view of the foldable display apparatus according to another embodiment of FIG. 2 taken along the line N-N.

In some embodiments, the first flexible printed circuit 11 may be arranged on a side of the first heat-dissipation film layer 36 away from the display part 10a. As shown in FIG. 5, the first flexible printed circuit 11 may include a first part 110, a second part 111 and a curved part 112 connecting the first part 110 with the second part 111. Specifically, an orthographic projection of the curved part 112 on the display part 10a may be located in a display area of the display part 10a. The first part 110 may be electrically connected to the binding part 10b. The second part 111 may be located on a side of the first part 110 away from the display part 10a. It should be understood that, as shown in FIG. 6, the display apparatus according to embodiments of the present disclosure may further include a first main circuit board 13, and the second part 111 may be electrically connected to the first main circuit board 13. It should be noted that the first main circuit board 13 may be located on a side of the second part 111 away from the first part 110.

As shown in FIGS. 5 and 6, the rigid film 12 may be provided between a side of the first heat-dissipation film layer 36 away from the display part 10a and the curved part 112. An orthographic projection of the rigid film 12 on the display part 10a may be located within an orthographic projection of the first heat-dissipation film layer 36 on the display part 10a, and the rigid film 12 can support the curved part 112 of the first flexible printed circuit 11. It should be understood that the rigidity of the rigid film 12 may be greater than the rigidity of the first heat-dissipation film layer 36 and the display part 10a. That is, the rigid film 12 is less likely to be deformed by force than the display part 10a and the first heat-dissipation film layer 36. For example, a material of the rigid film 12 may be polyimide (PI) or stainless steel (SUS). It should be understood that the PI material used for manufacturing the rigid film 12 should be a hard PI material.

In addition, a thickness of the rigid film 12 may be 0.1 mm to 0.5 mm, such as 0.1 mm, 0.2 mm, 0.3 mm, 0.4 mm, 0.5 mm, etc. The thickness of the rigid film 12 is designed to be greater than or equal to 0.1 mm, so that sufficient rigidity of the rigid film 12 can be ensured, and the thickness of the rigid film 12 is designed to be less than or equal to 0.5 mm, so that overall thickness of the product can be reduced.

In some embodiments of the present disclosure, the rigid film 12 is provided between the curved part 112 of the first flexible printed circuit 11 and the rear side of the display part 10a, and the rigid film 12 is not prone to deformation by force. In this way, the rigid film 12 can disperse and release the resilience force generated by the curved part 112 during an installation process, thus obvious imprints at the position in the display area of the display part 10a, corresponding to the curved part 112, can be avoided, thereby improving the display effect.

It should be noted that, the curved part 112 of the first flexible printed circuit 11 according to embodiments of the present disclosure is not limited to be provided in the display area of the display part 10a, but may also be provided in a non-display area.

In some embodiments of the present disclosure, the installation process may be as follows: the second part 111 of the first flexible printed circuit 11 is first electrically connected to the first main circuit board 13, and then the first flexible printed circuit 11 is bent to form the curved part 112 mentioned before, so that the first part 110 is located on a side of the second part 111 away from the first main circuit board 13. It should be noted that the first part 110 may be electrically connected to the binding part 10b before the second part 111 is electrically connected to the first main circuit board 13, or the first part 110 may be electrically connected to the binding part 10b when it is bent to the side of the second part 111 away from the first main circuit board 13.

As shown in FIG. 6, the first main circuit board 13 may be provided thereon with a first connection terminal 14, and the second part 111 of the first flexible printed circuit 11 may be provided with a mating terminal 15 capable of being buckled or socketed with the first connection terminal 14. That is, the mating terminal 15 and the first connection terminal 14 are buckled or socketed to realize an electrical connection between the first main circuit board 13 and the second part 111.

In some embodiments of the present disclosure, a bending axis corresponding to the curved part 112 of the first flexible printed circuit 11 may extend in a second direction Y (as shown in FIGS. 2 to 4), and the orthographic projection of the curved part 112 on the display part 10a has a first limit A and a second limit B opposite in the first direction X. It should be noted that the second limit B is a side of the curved part 112 close to the first part 110 and the second part 111, and the first limit A is a side of the curved part 112 away from the first part 110 and the second part 111, as shown in FIGS. 5 and 6. The orthographic projection of the rigid film 12 on the display part 10a has a third limit C and a fourth limit D opposite in the direction X, as shown in FIGS. 5 and 6. The third limit C is located on a side of the first limit A away from the second limit B, and the fourth limit D is located on a side of the second limit B away from the first limit A.

In some embodiments, by locating the first limit A and the second limit B of the curved part 112 within the third limit C and the fourth limit D of the rigid film 12, the resilience force generated by the curved part 112 can better dispersed by the rigid film 12. Specifically, compared with the arrangement in which the first limit A and the second limit B of the curved part 112 are located outside the third limit C and the fourth limit D of the rigid film 12, the arrangement according to the present embodiments can prevent the resilience force generated by the curved part 112 from concentrating at the third limit C and the fourth limit D of the rigid film 12, thus imprints at the positions in the display part 10a, corresponding to the third limit C and the fourth limit D of the rigid film 12, can be avoided, thereby improving the display effect.

It should be noted that in some embodiments of the present disclosure, the first direction X is perpendicular to the second direction Y, and both the first direction X and the second direction Y are perpendicular to the thickness direction Z of the foldable display apparatus.

Optionally, a distance between the third limit C of the rigid film 12 and the first limit A of the curved part 112 in the first direction X may be equal to a distance between the fourth limit D of the rigid film 12 and the second limit B of the curved part 112 in the first direction X, so that the uniformity of the overall force of the rigid film 12 can be ensured, to better disperse the stress, but not limited to this. The distance between the third limit C of the rigid film 12 and the first limit A of the curved part 112 in the first direction X may be unequal to the distance between the fourth limit D of the rigid film 12 and the second limit B of the curved part 112 in the first direction X.

In some embodiments of the present disclosure, the distance between the third limit C of the rigid film 12 and the first limit A of the curved part 112 in the first direction X may be greater than or equal to 1 cm. The distance between the fourth limit D of the rigid film 12 and the second limit B of the curved part 112 in the first direction X is greater than or equal to 1 cm. Such design enables the rigid film 12 to better disperse the stress.

It should be noted that, an area of the rigid film 12 according to embodiments of the present disclosure can be determined according to actual situations, as long as it can better disperse the stress to avoid the imprints during the installation process.

In some embodiments of the present disclosure, as shown in FIG. 6, a buffer part 16 may be provided in a bending volume of the curved part 112, and an orthographic projection of the buffer part 16 on the display part 10a is located within the orthographic projection of the rigid film 12 on the display part 10a. Specifically, the buffer part 16 may be arranged at a position of the curved part 112 close to the first part 110, and the orthographic projection of the buffer part 16 on the display part 10a is located in a central area of the orthographic projection of the rigid film 12 on the display part 10a.

In some embodiments of the present disclosure, the buffer part 16 is arranged in the bending volume of the curved part 112, in this way, the buffer part 16 is enabled to provide a buffer force for the curved part 112, to ensure a good ability to restore deformation of the curved part 112 and to avoid a dead bending of the curved part 112 during the installation process.

Figure 7:
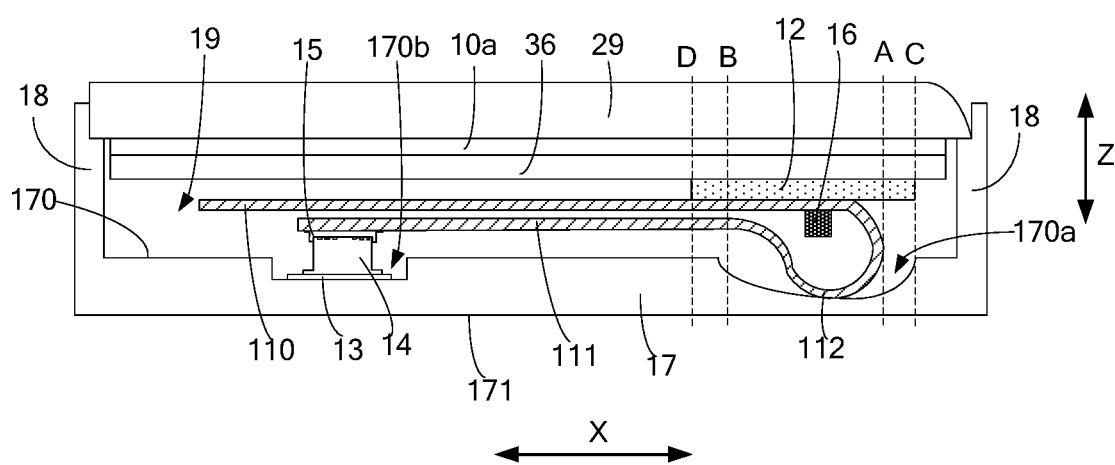
FIG. 7 shows a schematic sectional view of the foldable display apparatus according to another embodiment of FIG. 2 taken along the line N-N.

It should be understood that the foldable display apparatus according to embodiments of the present disclosure may further include a middle frame structure, which includes a first middle frame located in the first area S1. As shown in FIG. 7, the first middle frame may include a first mounting plate 17 and a first side plate 18. The first mounting plate 17 has a first mounting surface 170 and a second mounting surface 171 opposite to each other. The first side plate 18 is arranged around the first mounting surface 170, and forms, together with the first mounting surface 170, a first mounting groove 19. It should be noted that when the first mounting surface 170 is rectangular, the first side plate 18 may be arranged on four edges around the first mounting surface 170, but not limited to this. The first side plate 18 may also be arranged on three edges, or arranged on two opposite edges, etc., depending on specific situations.

The first display panel 10, the first flexible printed circuit 11, the rigid film 12, the first main circuit board 13, the first connection terminal 14, the mating terminal 15, and the buffer part 16 mentioned before may be located in the first mounting groove 19. Specifically, the first part 110 is located on a side of the second part 111 away from the first mounting surface 170. It should be noted that, as shown in FIG. 7, an avoidance groove 170a corresponding to the curved part 112 is provided on the first mounting surface 170, and a first fitting groove 170b is provided on the first mounting surface 170. The first main circuit board 13 mentioned before may be specifically located in the first fitting groove 170b, and a portion of the first connection terminal 14 protrudes from the first fitting groove 170b, and is socketed or buckled with the mating terminal 15 provided on the second part 111.

Optionally, an edge of the first cover plate 29 extends beyond an edge of the display part 10a, and a portion of the first cover plate 29 extending beyond the display part 10a may ride on an end surface of the first side plate 18 away from the first mounting surface 170. Specifically, the end surface of the first side plate 18 away from the first mounting surface 170 may be provided thereon with a positioning notch, and the portion of the first cover plate 29 extending beyond the display part 10a may ride on the positioning notch of the first side plate 18, as shown in FIG. 7.

Figure 8:
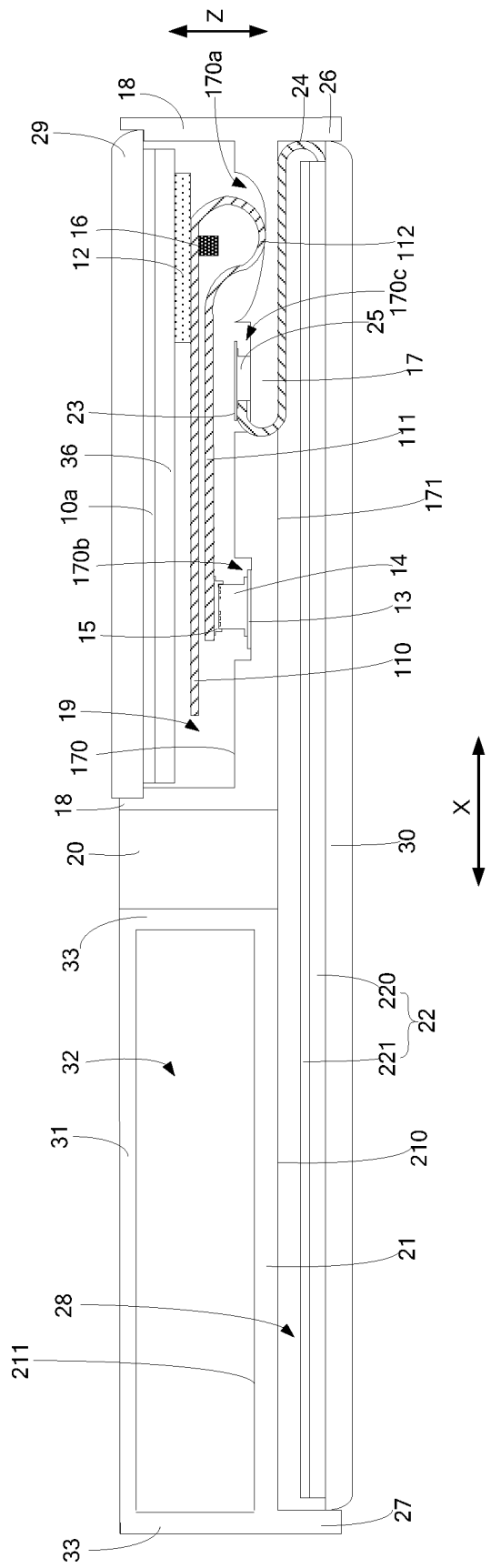
FIG. 8 shows a schematic sectional view of the foldable display apparatus according to still another embodiment of FIG. 2 taken along a line M-M.

It should be understood that the middle frame structure according to embodiments of the present disclosure may be a foldable mechanism, and in addition to the first middle frame located in the first area S1 mentioned before, it may also include a second middle frame rotatably connected to the first middle frame and located in the second area S2. As shown in FIG. 8, the second middle frame is rotatably connected to the first middle frame via a hinge mechanism 20, which may be located in the foldable area S3.

Herein, as shown in FIG. 8, the second middle frame may include at least a second mounting plate 21, and the second mounting plate 21 has a third mounting surface 210 and a fourth mounting surface 211 opposite to each other. In some embodiments, a relative rotation between the first middle frame and the second middle frame allows the third mounting surface 210 to rotate to a position facing the second mounting surface 171.

Optionally, as shown in FIG. 8, the foldable display apparatus according to embodiments of the present disclosure may further include a second display panel 22 located in the first area S1, the second area S2 and the foldable area S3. The second display panel 22 may be located on a side of the second mounting surface 171 away from the first mounting surface 170, and located on a side of the third mounting surface 210 away from the fourth mounting surface 211. It should be understood that a side of the second display panel 22 facing the second mounting surface 171 and the third mounting surface 210 is a rear side of the second display panel 22, and a side of the second display panel 22 away from the second mounting surface 171 and the third mounting surface 210 is a display side. For example, as shown in FIG. 8, the second display panel 22 may include a display substrate 220 and a second heat-dissipation film layer 221, and the second heat-dissipation film layer 221 may be arranged on a rear side of the display substrate 220. An orthographic projection of the second heat-dissipation film layer 221 is within or coincident with the display substrate 220.

In addition, a structure of the second heat-dissipation film layer 221 may be the same as a structure of the first heat-dissipation film layer 36 mentioned before, and details are not repeated here.

The second display panel 22 may be a flexible display panel, that is, the second display panel 22 has flexibility, and the first middle frame and the second middle frame rotate relative to each other so that the third mounting surface 210 is rotated to a position facing the second mounting surface 171 while the second display panel 22 is able to be bent. That is, the entire foldable display apparatus is able to be bent inward, i.e., a display surface of the display substrate 220 is located inside a bending.

In some embodiments of the present disclosure, as shown in FIG. 8, the foldable display apparatus may further include a second main circuit board 23 and a second flexible printed circuit 24. The second main circuit board 23 may be arranged on the first mounting plate 17 or the second mounting plate 21, and the second main circuit board 23 is provided thereon with a second connection terminal 25. One end of the second flexible printed circuit 24 is electrically connected to the second connection terminal 25, and the other end is electrically connected to the second display panel 22. It should be noted that one end of the second flexible printed circuit 24 may be bound to the second display panel 22 on the display side of the second display panel 22, but not limited to this. A portion of the second display panel 22 may also be bent towards a position away from the display side thereof to form a binding part, and then is electrically connected to the second flexible printed circuit 24.

For example, as shown in FIG. 8, the first mounting surface 170 mentioned before may be further provided thereon with a second fitting groove 170c, and the first mounting plate 17 is further provided with a through hole (not shown in the figure) penetrating the first mounting surface 170 and the second mounting surface 171, which communicates with the second fitting groove 170c. The second main circuit board 23 and the second connection terminal 25 are located in the second fitting groove 170c, and one end of the second flexible printed circuit 24 passes through the through hole and is electrically connected to the second connection terminal 25.

It should be noted that the second main circuit board 23 and the first main circuit board 13 may be integrated in a single structure or may be provided independently of each other. It should be understood that, when the second main circuit board 23 and the first main circuit board 13 are integrated in a single structure, the first fitting groove 170b and the second fitting groove 170c may communicate with each other.

In some embodiments of the present disclosure, as shown in FIG. 8, a second side plate 26 may be provided around the second mounting surface 171 of the first mounting plate 17. It should be understood that an edge of the second mounting surface 171 adjacent to the third mounting surface 210 may not be provided with the second side plate 26, and the other three edges may be provided with the second side plate 26, but not limited to this. A third side plate 27 may be provided around the third mounting surface 210 of the second mounting plate 21. It should be understood that an edge of the third mounting surface 210 adjacent to the second mounting surface 171 may not be provided with the third side plate 27, and the other three edges may be provided with the third side plate 27, but not limited to this. Herein, the second side plate 26, the second mounting surface 171, the third mounting surface 210 and the third side plate 27 may form a second mounting groove 28 by means of encirclement, and the second display panel 22 and the second flexible printed circuit 24 mentioned before may be located in the second mounting groove 28.

As shown in FIG. 8, the foldable display apparatus according to embodiments of the present disclosure may further include a second cover plate 30 located in the first area S1, the second area S2 and the foldable area S3. The second cover plate 30 is located on the display side of the second display panel 22, that is, the second cover plate 30 may be arranged on the side of the second display panel 22 away from the second mounting surface 171 and the third mounting surface 210. The second cover plate 30 and the second display panel 22 may constitute another display screen of the foldable display apparatus. An edge of the second cover plate 30 may also extend beyond an edge of the second display panel 22, and an outer contour of the second cover plate 30 may extend beyond an outer contour of the second display panel 22.

It should be noted that the second cover plate 30 may be a flexible cover plate, for example, it may be made of high molecular polymer material. That is, the second cover plate 30 is able to be bent. Specifically, the first middle frame and the second middle frame rotate relative to each other so that the third mounting surface 210 is rotated to a position facing the second mounting surface 171 while the second cover plate 30 is able to be bent together with the second display panel 22.

As shown in FIG. 8, a fourth side plate 33 may also be arranged around the fourth mounting surface 211. It should be noted that when the fourth mounting surface 211 is rectangular, the fourth side plate 33 may be arranged around on four edges of the fourth mounting surface 211, but not limited to this. The fourth side plate 33 may also be arranged on three edges, or arranged on two opposite edges, etc., depending on specific situations.

In addition, the second middle frame may further include a third mounting plate 31 opposite to the second mounting plate 21, and the fourth side plate 33, the third mounting plate 31 and the fourth mounting surface 211 of the second mounting plate 21 may form a third mounting groove 32 by means of encirclement. The display apparatus may further include a battery (not shown in the figure) and other structures, and the battery may be placed in the third mounting groove 32, but not limited to this. The third mounting groove 32 may also be provided therein with other structures. It should be noted that the second middle frame according to embodiments of the present disclosure may not include the third mounting plate 31, depending on specific situations.

It should be noted that, the entire first middle frame according to embodiments of the present disclosure may be an integrated structure, and the entire second middle frame may also be an integrated structure.

In some embodiment of the present disclosure, the first display panel 10 and the first cover plate 29 constitute a display screen, which may be a secondary display screen of the foldable display apparatus, and the second display panel 22 and the second cover plate 30 constitute a display screen, which may be a main display screen of the foldable display apparatus. When the foldable display apparatus is in the unfolded state, mainly the main display screen may be used for display, but not limited to this. The secondary display screen may also be used for display. When the foldable display apparatus is in the folded state, the secondary display screen may be used for display.

It should be noted that, when the foldable display apparatus is in the unfolded state, a side where the secondary display screen is located may be a rear view side of the foldable display apparatus, and a side where the main display screen is located may be a front view side of the foldable display apparatus. In addition, the main display screen and the secondary display screen according to embodiments of the present disclosure may be designed as a whole in a rectangular shape.

In some embodiments of the present disclosure, the specific type of the foldable display apparatus is not particularly limited, and any type of display apparatus commonly used in the art is acceptable, such as a mobile phone, a tablet computer, etc. Those skilled in the art can select respective display apparatus according to the specific use of the display apparatus, which will not be repeated here.

It should be noted that in addition to the structures mentioned before, the foldable display apparatus also includes other necessary components and compositions. Taking a mobile phone as an example, such as a front case, a back case, a touch function layer, a polarizer, a power cord, etc., may be included. Those skilled in the art can make corresponding supplements according to the specific usage requirements of the display apparatus, which will not be repeated here.

Based on the foregoing, the main display screen according to embodiments of the present disclosure is located in the entire area of the foldable display apparatus, and four edges of the main display screen are close to edges of the foldable display apparatus. Therefore, in order to improve the reliability of the main display screen during a drop test, an edge portion of the second cover plate 30 at its four edges may be provided in an arc shape. Specifically, as shown in FIG. 8, a surface of the edge portion of the second cover plate 30 away from the second display panel 22 is provided in an arc-shaped surface, which may be manufactured by machining. Alternatively, the edge portion of the second cover plate 30 is bent as a whole to form an arc-shaped structure, and such bending can be carried out by hot bending, for example.

In some embodiments of the present disclosure, each of the edge portions of the second cover plate 30 at its four edges is provided in an arc shape, thus the stress concentration at the edges of the second cover plate 30 during the drop test and damage to the cover plate can be avoided. In addition, when the edge portion of the second cover plate 30 is bent as a whole to form an arc-shaped structure, an edge of the second display panel 22 can also be bent along with the edge portion of the second cover plate 30 to form the arc-shaped structure, which can facilitate realization of a full-screen display.

It should be understood that the present disclosure is not limited to the fact that each of the edge portions of the second cover plate 30 at its four edges is provided in an arc shape, and that the edge portions of the second cover plate 30 located at two opposite edges are provided in an arc shape is possible, depending on product requirements.

In addition, based on the foregoing, the secondary display screen according to embodiments of the present disclosure is located in half area of the foldable display apparatus. Only three edges of the secondary display screen are close to the edges of the foldable display apparatus, and the other edge of the secondary display screen is close to the middle area of the foldable display apparatus. In order to improve the product reliability of the secondary display screen, a structure of the first cover plate 29 is designed in embodiments of the present disclosure, which will be described in detail below with reference to the drawings.

Figure 10:
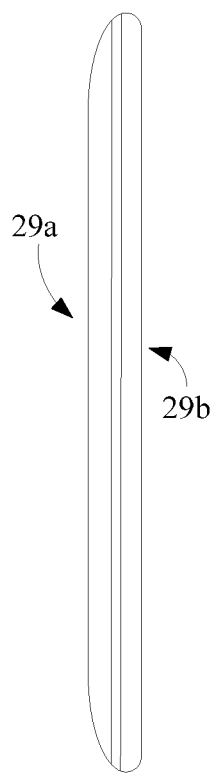
FIG. 10 shows a schematic side view of a first cover plate of the foldable display apparatus according to an embodiment of FIG. 9.
Figure 11:
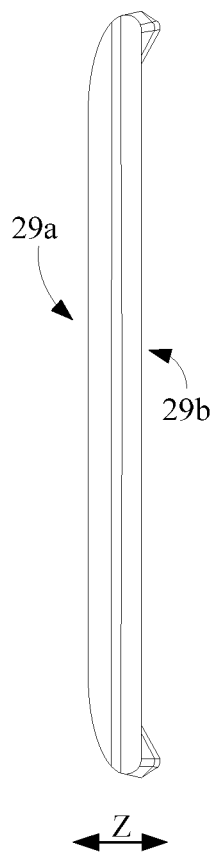
FIG. 11 shows a schematic side view of a first cover plate of the foldable display apparatus according to another embodiment of FIG. 9.

In some embodiments of the present disclosure, as shown in FIGS. 10 and 11, a surface of the first cover plate 29 away from the first display panel 10 may be a first surface 29*a*, that is, the first surface 29*a* is an outer surface of the first cover plate 29; a surface of the first cover plate 29 close to the first display panel 10 may be a second surface 29*b*, that is, the second surface 29*b* is an inner surface of the first cover plate 29.

Figure 9:
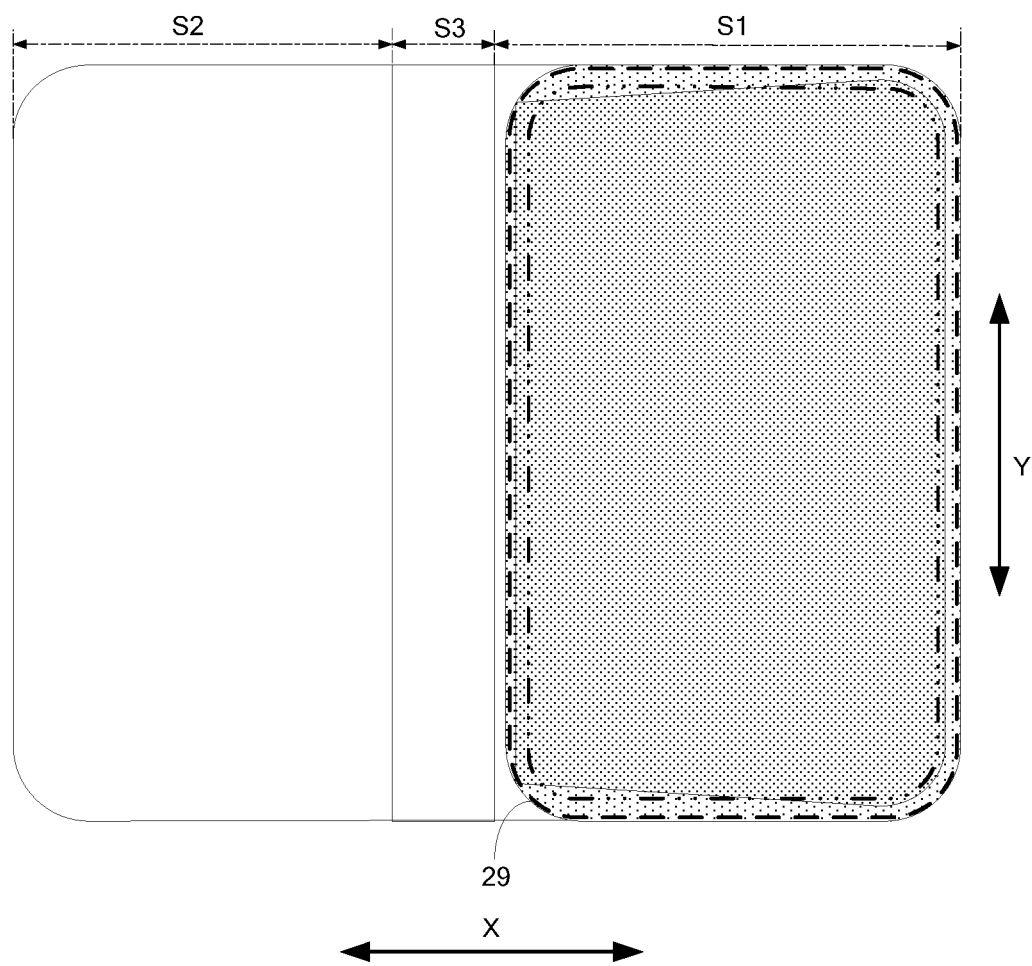
FIG. 9 shows a schematic structural diagram of a foldable display apparatus in an unfolded state according to another embodiment of the present disclosure.
Figure 12:
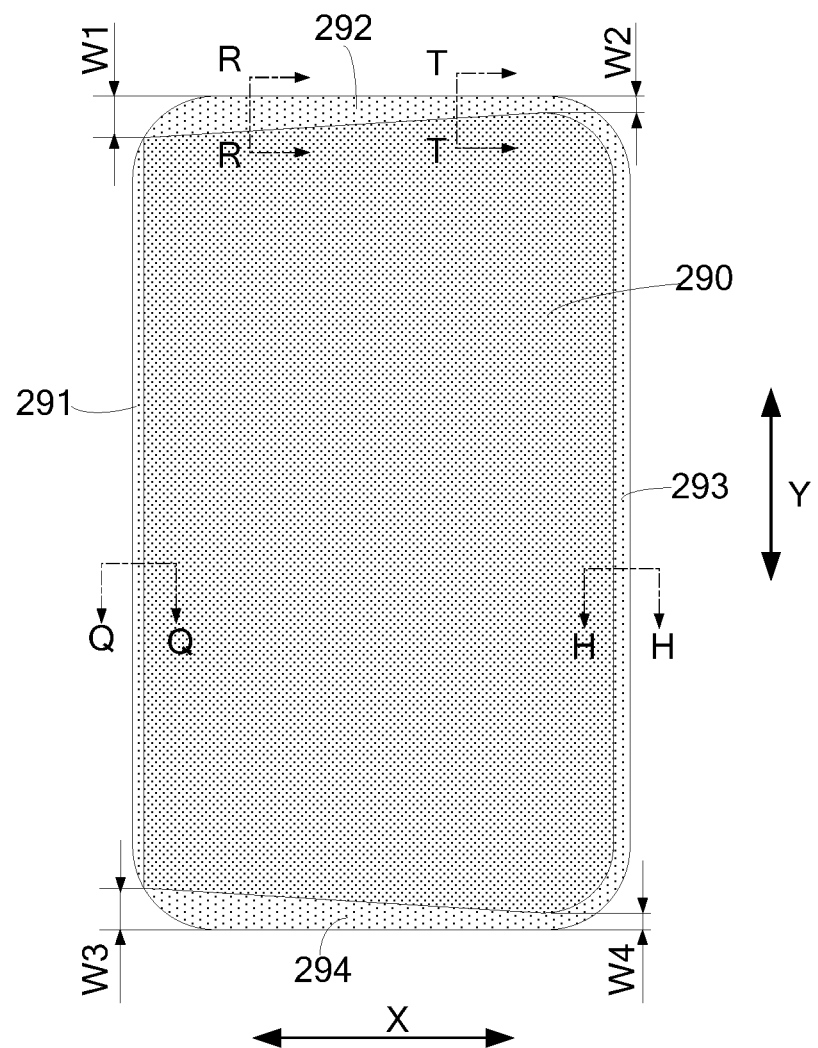
FIG. 12 shows a schematic plan view of a first cover plate of the foldable display apparatus according to an embodiment of FIG. 9 from an external viewing angle.
Figure 13A:
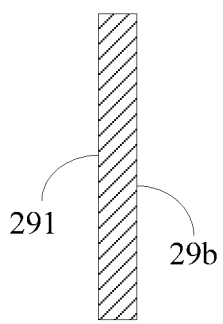
FIG. 13a shows a schematic sectional view of the first cover plate according to an embodiment of FIG. 12 taken along a line Q-Q.
Figure 13B:
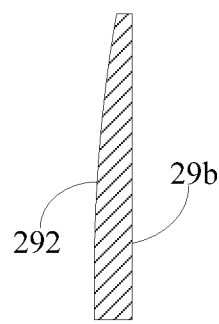
FIG. 13b shows a schematic sectional view of the first cover plate according to an embodiment of FIG. 12 taken along a line R-R.
Figure 13C:
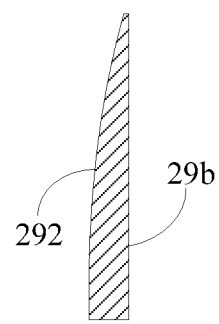
FIG. 13c shows a schematic sectional view of the first cover plate according to an embodiment of FIG. 12 taken along a line T-T.
Figure 13D:
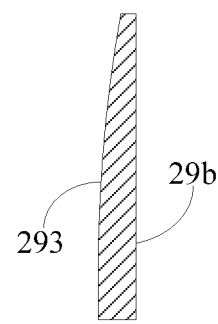
FIG. 13d shows a schematic sectional view of the first cover plate according to an embodiment of FIG. 12 taken along a line H-H.
Figure 14A:
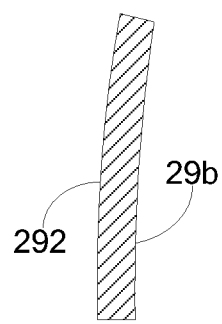
FIG. 14a shows a schematic sectional view of the first cover plate according to another embodiment of FIG. 12 taken along the line R-R.
Figure 14B:
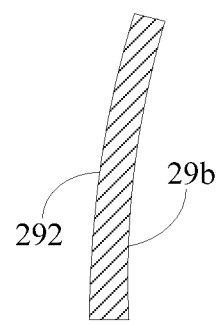
FIG. 14b shows a schematic sectional view of the first cover plate according to another embodiment of FIG. 12 taken along the line T-T.
Figure 14C:
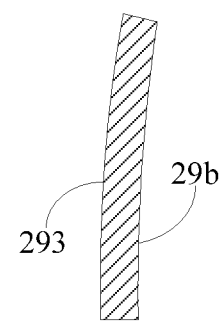
FIG. 14c shows a schematic sectional view of the first cover plate according to another embodiment of FIG. 12 taken along the line H-H.

In some embodiments, as shown in FIG. 12, the first surface 29*a* may include a central plane 290, a marginal plane 291, a first marginal cambered surface 292, a second marginal cambered surface 293 and a third marginal cambered surface 294, wherein the marginal plane 291, the first marginal cambered surface 292, the second marginal cambered surface 293 and the third marginal cambered surface 294 surround the central plane 290 and are connected end to end in sequence. The marginal plane 291 and the second marginal cambered surface 293 are oppositely arranged in the first direction X, and the first marginal cambered surface 292 and the third marginal cambered surface 294 are oppositely arranged in the second direction Y. It should be noted that the marginal plane 291 is located on a side of the second marginal cambered surface 293 close to the foldable area S3, as shown in FIGS. 9, 12 and 13*a*. A curvature of the first marginal cambered surface 292 gradually decreases along a direction from the second marginal cambered surface 293 to the marginal plane 291, as shown in FIGS. 12, 13*b* and 13*c*, or as shown in FIGS. 12, 14*a* and 14*b*. Similarly, a curvature of the third marginal cambered surface 294 gradually decreases along a direction from the second marginal cambered surface 293 to the marginal plane 291.

In some embodiments of the present disclosure, some areas of the outer surface of the first cover plate 29 located at the edges of the foldable display apparatus are provided as a cambered surface, namely the first marginal cambered surface 292, the second marginal cambered surface 293 and the third marginal cambered surface 294, as shown in FIGS. 12, 13*b* to 13*d*, or as shown in FIGS. 12, 14*a* to 14*c*. As a result, in one aspect, the stress concentration at the edges of the first cover plate 29 during the drop test and damage to the first cover plate 29 can be avoided, thereby improving the product reliability of the first cover plate 29 and the foldable display apparatus during the drop test. In another aspect, a contact area between the first cover plate 29 and a user's hand can be appropriately increased, so that the stress concentration on the user's hand caused by the edges of the first cover plate 29 when the foldable display apparatus is held in hands can be properly alleviated, thereby improving the user experience.

In addition, an area of the outer surface of the first cover plate 29 located in the middle of the foldable display apparatus is provided as a plane, namely the marginal plane 291, as shown in FIGS. 12 and 13*a*. As a result, in one aspect, when the foldable display apparatus is in the unfolded state, a gap generated in the middle of the rear surface (i.e., the plane where the first surface 29*a* of the first cover plate 29 is located) of the foldable display apparatus can be reduced, thereby improving the product quality. In another aspect, a supporting area of the rear surface of the foldable display apparatus can be increased, thus when the rear surface of the foldable display apparatus is used as a supporting surface, the stress concentration in the middle of the rear surface of the foldable display apparatus can be alleviated, thereby prolonging the service life of the product.

In order to realize a smooth transition at the edges of the first cover plate 29, the curvatures of the first marginal cambered surface 292 and the third marginal cambered surface 294 need to be gradually reduced from the second marginal cambered surface 293 to the marginal plane 291, as shown in FIGS. 12, 13*b* and 13*c*, or as shown in FIGS. 12, 14*a* and 14*b*. Such design can avoid stress concentration that easily occurs at which the first marginal cambered surface 292/the third marginal cambered surface 294 meets the marginal plane 291, in a case where curvature difference between the first marginal cambered surface 292/the third marginal cambered surface 294 and the marginal plane 291 is too large, which improves the structural strength of the first cover plate 29 and prolongs its service life.

Optionally, a curvature of the first marginal cambered surface 292 at which the first marginal cambered surface 292 meets the marginal plane 291 may be 0, and a curvature of the third marginal cambered surface 294 at which the third marginal cambered surface 294 meets the marginal plane 291 may be 0. As a result, the stress concentration that easily occurs between the first marginal cambered surface 292/the third marginal cambered surface 294 and the marginal plane 291 can be further avoided, thereby improving the structural strength of the first cover plate 29 and prolonging its service life.

As shown in FIG. 12, a width of the first marginal cambered surface 292 at which the first marginal cambered surface 292 meets the marginal plane 291 is W1, and a width of the first marginal cambered surface 292 at which the first marginal cambered surface 292 meets the second marginal cambered surface 293 is W2. A ratio of W2 to W1 is 0.5 to 0.8, such as 0.5, 0.55, 0.65, 0.7, 0.75, 0.8, etc. For example, W1 may be 4 mm, and W2 may be 3 mm. Such design can avoid damage to the edges that easily occurs during the drop test, and realize the smooth transition, while the proportion of the marginal cambered surfaces can also be reduced. In one aspect, it ensures the structural strength of the product itself, and in another aspect, it can improve the visual effect and the user experience. Similarly, a width of the third marginal cambered surface 294 at which the third marginal cambered surface 294 meets the marginal plane 291 is W3, and a width of the third marginal cambered surface 294 at which the third marginal cambered surface 294 meets the second marginal cambered surface 293 is W4. A ratio of W4 to W3 is 0.5 to 0.8, such as 0.5, 0.55, 0.65, 0.7, 0.75, 0.8, etc. For example, W3 may be 4 mm, and W4 may be 3 mm. It should be noted that the widths W1, W2, W3, and W4 are dimensions in the second direction Y In some embodiments, a curvature of the second marginal cambered surface 293 is the same everywhere in the second direction Y, so as to reduce the processing difficulty. It should be noted that, a curvature of the first marginal cambered surface 292 at which the first marginal cambered surface 292 meets the second marginal cambered surface 293 may be the same as the curvature of the second marginal cambered surface 293, but not limited to this. The curvature of the first marginal cambered surface 292 at which the first marginal cambered surface 292 meets the second marginal cambered surface 293 may also be different from the curvature of the second marginal cambered surface 293, depending on specific situations. Similarly, a curvature of the third marginal cambered surface 294 at which the third marginal cambered surface 294 meets the second marginal cambered surface 293 may be the same as the curvature of the second marginal cambered surface 293, but not limited to this. The curvature of the third marginal cambered surface 294 at which the third marginal cambered surface 294 meets the second marginal cambered surface 293 may also be different from the curvature of the second marginal cambered surface 293, depending on specific situations.

As shown in FIGS. 10, 12 and 13a to 13d, in some embodiments of the present disclosure, the second surface 29b of the first cover plate 29 may be a plane as a whole, which can reduce the processing difficulty of the first cover plate 29, so as to reduce costs.

In other embodiments of the present disclosure, with regards to the second surface 29b of the first cover plate 29, an area of the second surface 29b opposite to the central plane 290 and an area of the second surface 29b opposite to the marginal plane 291 of may be both planes. As shown in FIGS. 11, 12 and 14a to 14c, areas of the second surface 29b opposite to the first marginal cambered surface 292, opposite to the second marginal cambered surface 293 and opposite to the third marginal cambered surface 294 are all cambered surfaces. That is, the portions of the first cover plate 29 close to the edges of the entire foldable display apparatus can be bent into an arc-shaped structure as a whole.

Among above areas of the second surface 29b, a curvature of an area of the second surface 29b opposite to the first marginal cambered surface 292 is the same as the curvature of the first marginal cambered surface 292, a curvature of an area of the second surface 29b opposite to the second marginal cambered surface 293 is the same as the curvature of the second marginal cambered surface 293, and a curvature of an area of the second surface 29b opposite to the third marginal cambered surface 294 is the same as the curvature of the third marginal cambered surface 294, but not limited to this. The corresponding curvature between areas may be different, depending on specific situations.

It should be noted that, in the case where the portions of the first cover plate 29 close to the edges of the entire foldable display apparatus can be bent into an arc-shaped structure as a whole, the portions of the first display panel 10 close to the edges of the entire foldable display apparatus can also be bent along with edge portions of the first cover plate 29, to form an arc-shaped structure, which can facilitate realization of a full-screen display.

Figure 15:
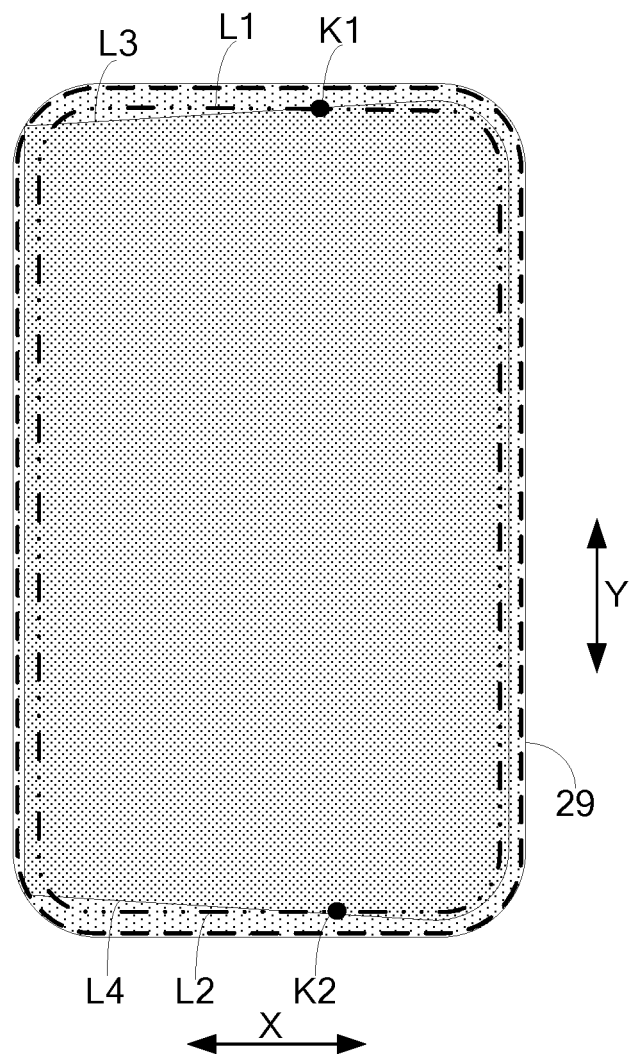
FIG. 15 shows a schematic plan view of a first cover plate of the foldable display apparatus according to an embodiment of FIG. 9 from an external viewing angle.

In some embodiments of the present disclosure, a location between the first cover plate 29 and the first display panel 10 may refer to FIGS. 9, 12 and 15. Specifically, the first display panel 10 includes a display area (the area enclosed by a double dot dash line in FIG. 15) and a non-display area (the area enclosed by the double dot dash line and a dashed line in FIG. 15) arranged around the display area. The display area has a first boundary L1 and a second boundary L2 opposite in the second direction Y. Both the first boundary L1 and the second boundary L2 extend in the first direction X. A boundary at which the first marginal cambered surface 292 meets the central plane 290 is a third boundary L3, and the third boundary L3 intersects with the first boundary L1 at a first intersection point K1. A boundary at which the third marginal cambered surface 294 meets the central plane 290 is a fourth boundary L4, and the fourth boundary L4 intersects with the second boundary L2 at a second intersection point K2.

In some embodiments, a ratio of a length of a line segment of the first boundary L1 extending from the first intersection point K1 towards the second marginal cambered surface 293 to a length of a line segment of the first boundary L1 extending from the first intersection point K1 towards the marginal plane 291 is 0.2 to 0.5, such as 0.2, 0.3, 0.4, 0.5, etc. Such design can realize the smooth transition, while reducing the effect on display by the cover plate. Similarly, a ratio of a length of a line segment of the second boundary L2 extending from the second intersection point K2 towards the second marginal cambered surface 293 to a length of a line segment of the second boundary L2 extending from the second intersection point K2 towards the marginal plane 291 is 0.2 to 0.5, such as 0.2, 0.3, 0.4, 0.5, etc.

It should be noted that, according to the foregoing embodiments, the first display panel 10 may include the display part 10a, the binding part 10b located on the rear side of the display part 10a, and the bending part 10c connecting the display part 10a with the binding part 10b. As shown in FIGS. 2, 4, 9, 12 and 15, a part of an orthographic projection of the binding part 10b on a reference plane is located within an orthographic projection of the third marginal cambered surface 294 on the reference plane, and another part of the orthographic projection of the binding part 10b on the reference plane is located within an orthographic projection of the central plane 290 on the reference plane. It should be understood that the reference plane herein is a plane parallel to the central plane 290.

Other embodiments of the present disclosure will be readily conceivable to those skilled in the art upon consideration of the specification and practice of the invention disclosed herein. The present disclosure is intended to cover any variations, uses, or adaptations of the disclosure that follow the general principles of the present disclosure and include common knowledge or conventional technical means in the technical field not disclosed by the disclosure. The specification and examples are to be regarded as exemplary only, and the true scope and spirit of the present disclosure are indicated by the appended claims.

What is claimed is:

1. A cover plate, applied to a foldable display apparatus comprising a first area, a second area and a foldable area connecting the first area and the second area, wherein the foldable display apparatus comprises a first display panel located in the first area, and the cover plate is located in the first area and arranged on a display side of the first display panel; wherein
a surface of the cover plate away from the first display panel is a first surface; the first surface comprises a central plane, a marginal plane, a first marginal cambered surface, a second marginal cambered surface and a third marginal cambered surface, wherein the marginal plane, the first marginal cambered surface, the second marginal cambered surface and the third marginal cambered surface surround the central plane and are connected end to end in sequence, the marginal plane and the second marginal cambered surface are oppositely arranged in a first direction, and the first marginal cambered surface and the third marginal cambered surface are oppositely arranged in a second direction, the second direction and the first direction being perpendicular to each other; and wherein the marginal plane is located on a side of the second marginal cambered surface close to the foldable area, and a curvature of the first marginal cambered surface and a curvature of
the third marginal cambered surface gradually decrease along a direction from the second marginal cambered surface to the marginal plane.

2. The cover plate according to claim 1, wherein
the curvature of the first marginal cambered surface at which the first marginal cambered surface meets the marginal plane is 0; and
the curvature of the third marginal cambered surface at which the third marginal cambered surface meets the marginal plane is 0.

3. The cover plate according to claim 2, wherein
a width of the first marginal cambered surface at which the first marginal cambered surface meets the marginal plane is W1, a width of the first marginal cambered surface at which the first marginal cambered surface meets the second marginal cambered surface is W2, and a ratio of W2 to W1 is 0.5 to 0.8; and
a width of the third marginal cambered surface at which the third marginal cambered surface meets the marginal plane is W3, a width of the third marginal cambered surface at which the third marginal cambered surface meets the second marginal cambered surface is W4, and a ratio of W4 to W3 is 0.5 to 0.8;
wherein the width is a dimension in the second direction.

4. The cover plate according to claim 1, wherein a curvature of the second marginal cambered surface is the same everywhere in the second direction.

5. The cover plate according to claim 1, wherein a surface of the cover plate close to the first display panel is a second surface, wherein the second surface is a plane.

6. The cover plate according to claim 1, wherein a surface of the cover plate close to the first display panel is a second surface, wherein
an area of the second surface opposite to the central plane and an area of the second surface opposite to the marginal plane are both planes; and
areas of the second surface opposite to the first marginal cambered surface, the second marginal cambered surface, and the third marginal cambered surface are all cambered surfaces.

7. The cover plate according to claim 6, wherein
a curvature of the area of the second surface opposite to the first marginal cambered surface is the same as the curvature of the first marginal cambered surface;
a curvature of the area of the second surface opposite to the second marginal cambered surface is the same as a curvature of the second marginal cambered surface; and
a curvature of the area of the second surface opposite to the third marginal cambered surface is the same as the curvature of the third marginal cambered surface.

8. A foldable display apparatus, wherein the foldable display apparatus comprises a first area, a second area, and a foldable area connecting the first area and the second area, wherein the foldable display apparatus comprises a first display panel and a first cover plate; the first display panel and the first cover plate are located in the first area; and the first cover plate is arranged on a display side of the first display panel; and wherein
a surface of the cover plate away from the first display panel is a first surface; the first surface comprises a central plane, a marginal plane, a first marginal cambered surface, a second marginal cambered surface and a third marginal cambered surface, wherein the marginal plane, the first marginal cambered surface, the second marginal cambered surface and the third marginal cambered surface surround the central plane and are connected end to end in sequence, the marginal plane and the second marginal cambered surface are oppositely arranged in a first direction, and the first marginal cambered surface and the third marginal cambered surface are oppositely arranged in a second direction, the second direction and the first direction being perpendicular to each other, and wherein
the marginal plane is located on a side of the second marginal cambered surface close to the foldable area, and a curvature of the first marginal cambered surface and a curvature of the third marginal cambered surface gradually decrease along a direction from the second marginal cambered surface to the marginal plane.

9. The foldable display apparatus according to claim 8, wherein
the first display panel comprises a display area and a non-display area arranged around the display area; the display area has a first boundary and a second boundary opposite in the second direction; and both the first boundary and the second boundary extend in the first direction;
a boundary at which the first marginal cambered surface meets the central plane is a third boundary; and the third boundary intersects with the first boundary at a first intersection point; and a boundary at which the third marginal cambered surface meets the central plane is a fourth boundary; and the fourth boundary intersects with the second boundary at a second intersection point; wherein a ratio of a length of a line segment of the first boundary extending from the first intersection point towards the second marginal cambered surface to a length of a line segment of the first boundary extending from the first intersection point towards the marginal plane is 0.2 to 0.5; and a ratio of a length of a line segment of the second boundary extending from the second intersection point towards the second marginal cambered surface to a length of a line segment of the second boundary extending from the second intersection point towards the marginal plane is 0.2 to 0.5.

10. The foldable display apparatus according to claim 9, wherein the first display panel is flexible, and comprises a display part, a binding part located on a rear side of the display part, and a bending part connecting the display part and the binding part; the first cover plate is arranged on a display side of the display part; and the display part comprises the display area and the non-display area; wherein a part of an orthographic projection of the binding part on a reference plane is located within an orthographic projection of the third marginal cambered surface on the reference plane, and another part of the orthographic projection of the binding part on the reference plane is located within an orthographic projection of the central plane on the reference plane, wherein the reference plane is a plane parallel to the central plane.

11. The foldable display apparatus according to claim 8, further comprising a second display panel and a second cover plate, wherein the second display panel and the second cover plate are located in the first area, the second area and the foldable area; wherein the second display panel and the second cover plate are flexible, a side of the second display panel away from the first display panel is a display side of the second display panel, the second cover plate is located on the display side of the second display panel, and an outer contour of the second cover plate extends beyond an outer contour of the second display panel.

12. The foldable display apparatus according to claim 8, wherein the curvature of the first marginal cambered surface at which the first marginal cambered surface meets the marginal plane is 0; and the curvature of the third marginal cambered surface at which the third marginal cambered surface meets the marginal plane is 0.

13. The foldable display apparatus according to claim 12, wherein a width of the first marginal cambered surface at which the first marginal cambered surface meets the marginal plane is W1, a width of the first marginal cambered surface at which the first marginal cambered surface meets the second marginal cambered surface is W2, and a ratio of W2 to W1 is 0.5 to 0.8; and a width of the third marginal cambered surface at which the third marginal cambered surface meets the marginal plane is W3, a width of the third marginal cambered surface at which the third marginal cambered surface meets the second marginal cambered surface is W4, and a ratio of W4 to W3 is 0.5 to 0.8;

wherein the width is a dimension in the second direction.

14. The foldable display apparatus according to claim 8, wherein a curvature of the second marginal cambered surface is the same everywhere in the second direction.

15. The foldable display apparatus according to claim 8, wherein a surface of the cover plate close to the first display panel is a second surface, wherein the second surface is a plane.

16. The foldable display apparatus according to claim 8, wherein a surface of the cover plate close to the first display panel is a second surface, wherein an area of the second surface opposite to the central plane and an area of the second surface opposite to the marginal plane are both planes; and areas of the second surface opposite to the first marginal cambered surface, the second marginal cambered surface, and the third marginal cambered surface are all cambered surfaces.

17. The foldable display apparatus according to claim 16, wherein a curvature of the area of the second surface opposite to the first marginal cambered surface is the same as the curvature of the first marginal cambered surface;

a curvature of the area of the second surface opposite to the second marginal cambered surface is the same as a curvature of the second marginal cambered surface; and a curvature of the area of the second surface opposite to the third marginal cambered surface is the same as the curvature of the third marginal cambered surface.

\* \* \* \* \*